US008533380B2

(12) United States Patent
Chang

(10) Patent No.: US 8,533,380 B2
(45) Date of Patent: Sep. 10, 2013

(54) APPARATUS FOR PEER-TO-PEER COMMUNICATION OVER A UNIVERSAL SERIAL BUS LINK

(75) Inventor: Ming-Te Chang, New Taipei (TW)

(73) Assignee: Ours Technology Inc., Hsinchu Hsien (TW)

( * ) Notice: Subject to any disclaimer, the term of this patent is extended or adjusted under 35 U.S.C. 154(b) by 284 days.

(21) Appl. No.: 13/182,419

(22) Filed: Jul. 13, 2011

(65) Prior Publication Data
US 2013/0019035 A1 Jan. 17, 2013

(51) Int. Cl.
G06F 13/20 (2006.01)
G06F 3/00 (2006.01)

(52) U.S. Cl.
USPC ............................................ 710/313; 710/36

(58) Field of Classification Search
USPC .................... 710/305–316, 14–16, 36, 62–63
See application file for complete search history.

(56) References Cited

U.S. PATENT DOCUMENTS 8,052,438 B1* 11/2011 Hung ............................ 439/131
8,112,571 B1* 2/2012 Letourneur ................... 710/311
2010/0169511 A1* 7/2010 Dunstan et al. .................. 710/16
2011/0161530 A1* 6/2011 Pietri et al. ....................... 710/14
2011/0191503 A1* 8/2011 Kakish ............................ 710/15
2011/0219272 A1* 9/2011 Lai et al. ........................ 714/54
2012/0011286 A1* 1/2012 Wong et al. ..................... 710/14
2012/0042178 A1* 2/2012 Ishii et al. ..................... 713/300
2012/0233373 A1* 9/2012 Ohashi .......................... 710/313
2012/0246372 A1* 9/2012 Chang .......................... 710/301

* cited by examiner

Primary Examiner — Christopher Shin
(74) Attorney, Agent, or Firm — Abe Hershkovitz; Hershkovitz & Associates PLLC

(57) ABSTRACT

An apparatus for peer-to-peer communication over a Universal Serial Bus (USB) link, the apparatus comprising a USB 3.0 compliant switch to be coupled between a first peer unit and a second peer unit to form a first path, wherein each of the first peer unit and the second peer unit supports a USB type of communication a USB 2.0 compliant bridge to be coupled between the first peer unit and the second peer unit to form a second path a detector to detect the USB type of each of the first peer unit and the second peer unit and a controller to establish the USB type of communication between the first peer unit and the second peer unit over a USB link via the first path or the second path, wherein the controller is configure to selectively switch the USB link to the first path or the second path based on the USB types of the first peer unit and the second peer unit.

18 Claims, 12 Drawing Sheets

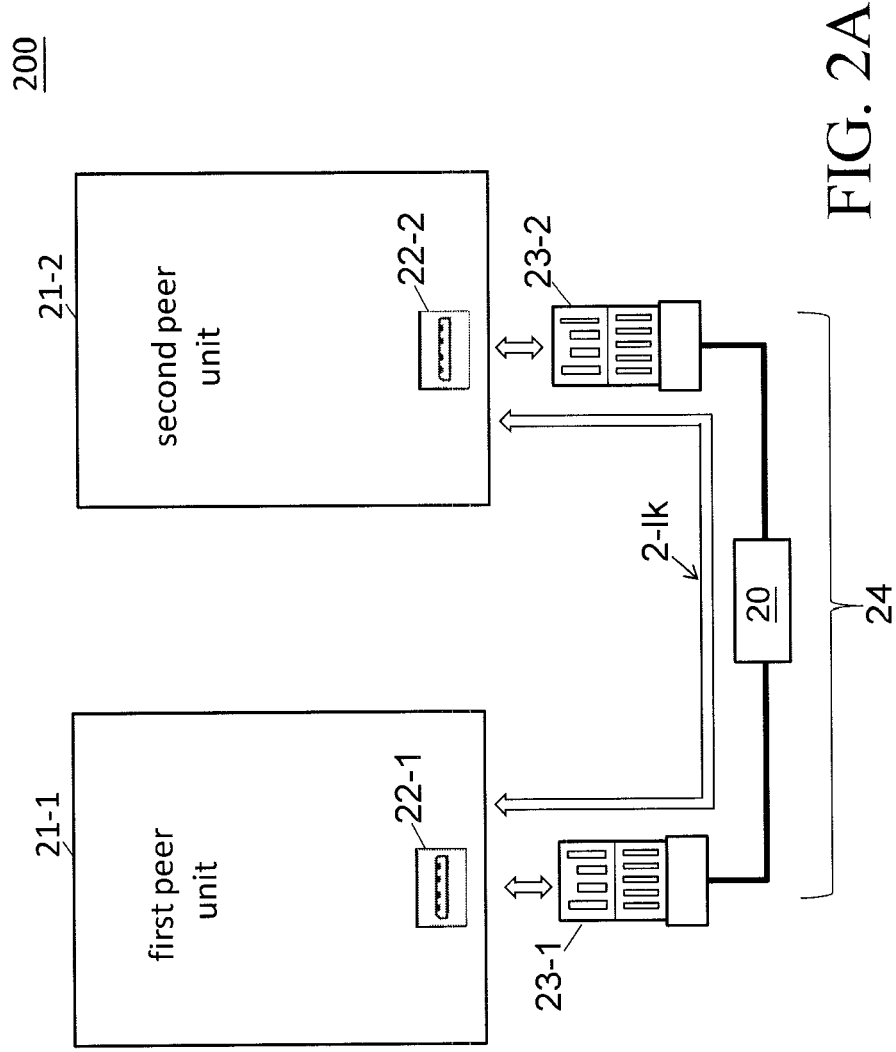

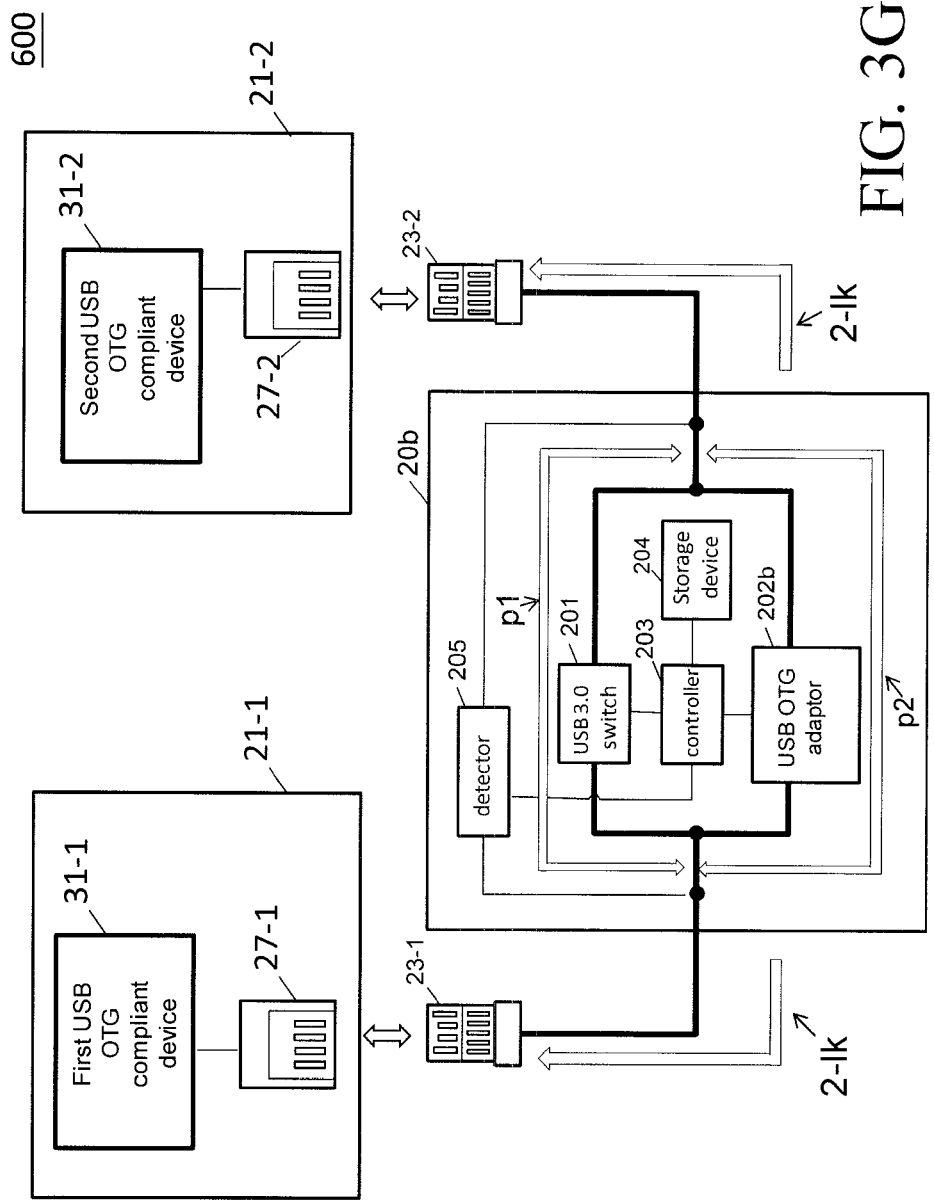

APPARATUS FOR PEER-TO-PEER COMMUNICATION OVER A UNIVERSAL SERIAL BUS LINK

BACKGROUND OF THE INVENTION

The present invention generally relates to peer-to-peer communication and, more particularly, to an apparatus for peer-to-peer communication over a Universal Serial Bus (USB) link.

As the demand for high speed communication between hosts (for example, personal computers) and peripheral devices (for example, media players or optical storages) grows, Universal Serial Bus (USB) specification has been developed and taken into practice for decades to fulfill such demand. The USB 2.0 specification specifies and provides for direct communication between a host and a peripheral device (or a plurality of peripheral devices) through a USB link at a speed up to 480 megabits per second (Mbps). In addition, the USB "on the go" (OTG) specification that supplements the legacy USB 2.0 specification further allows direct device-to-device communication through a USB link, without using any host as an intermediate bridge between the devices.

For achieving higher transmission bandwidth of host-to-device or device-to-device communication over the USB link, USB 3.0 specification has been released, in which the transmission rate is further enhanced to 5 gigabits per second (Gbps), approximately ten times of the transmission rate of the USB 2.0 specification. The USB 3.0 specification may further provide for direct host-to-host communication via a USB link without any intermediate bridge therebetween, as will be discussed below.

FIG. 1 is a block diagram of a peer-to-peer communication system 100 using a USB link 1-lk in prior art. Referring to FIG. 1, the system 100 may include a first peer unit 11-1 and a second peer unit 11-2. The first and second peer units 11-1 and 11-2 may include a first host and a second host, respectively, each of which has a USB 3.0 compliant host controller interface (HCI) or extensible HCI (i.e., xHCI) and a USB 2.0 compliant HCI (i.e., EHCI). A peer-to-peer communication (i.e., host-to-host communication in this example) between the first host 11-1 and the second host 11-2 may be established over the USB link 1-lk through a USB 3.0 compliant receptacle 12-1 of the first host 11-1, a USB 3.0 cable 14 with USB 3.0 plugs 13-1 and 13-2 and a USB 3.0 compliant receptacle 12-2 of the second host 11-2. Specifically, the first and second hosts 11-1 and 11-2 may negotiate with each other, determine which one to operate as a host while the other one to operate as a device, and perform a "physical" host-to-device communication that may in turn achieve a "virtual" host-to-host communication. As a result, the first and second hosts 11-1 and 11-2 may communicate with each other directly without any intermediate bridge. However, such host-to-host communication is available only in the presence of a USB 3.0 cable 14 with a pair of USB 3.0 plugs 13-1 and 13-2 in conjunction with a pair of USB 3.0 receptacles 12-1 and 12-2. Accordingly, the peer-to-peer communication system 100 may only allow direct host-to-host communication over a USB link through a USB 3.0 cable with the both hosts compliant with the USB 3.0 specification.

It may therefore be desirable to have an apparatus that allows direct peer-to-peer communication over a USB link between a pair of USB 2.0 hosts, a pair of USB 2.0 devices, and between a USB 3.0 host and a USB 2.0 host, in addition to a pair of USB 3.0 hosts.

BRIEF SUMMARY OF THE INVENTION

Examples of the present invention may provide an apparatus for peer-to-peer communication over a Universal Serial Bus (USB) link, the apparatus comprising a USB 3.0 compliant switch to be coupled between a first peer unit and a second peer unit to form a first path, wherein each of the first peer unit and the second peer unit supports a USB type of communication a USB 2.0 compliant bridge to be coupled between the first peer unit and the second peer unit to form a second path a detector to detect the USB type of each of the first peer unit and the second peer unit and a controller to establish the USB type of communication between the first peer unit and the second peer unit over a USB link via the first path or the second path, wherein the controller is configure to selectively switch the USB link to the first path or the second path based on the USB types of the first peer unit and the second peer unit.

Other examples of the present invention may provide a method of establishing peer-to-peer communication over a Universal Serial Bus (USB) link, the method comprising providing a first peer unit and a second peer unit, wherein each of the first peer unit and the second peer unit supports a USB type of communication; providing a USB 3.0 compliant switch to be coupled between the first peer unit and the second peer unit to form a first path; providing a USB 2.0 compliant bridge to be coupled between the first peer unit and the second peer unit to form a second path; detecting the USB type of each of the first peer unit and the second peer unit; establishing the USB type of communication between the first peer unit and the second peer unit over a USB link via the first path or the second path; and selectively switching the USB link to the first path or the second path based on the USB types of the first peer unit and the second peer unit.

Additional features and advantages of the present invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings examples which are presently preferred. It should be understood, however, that the invention is not limited to the precise arrangements and instrumentalities shown.

In the drawings:

FIG. 2A is a block diagram of a peer-to-peer communication system over a USB link in accordance with an example of the present invention;

FIG. 3G is a block diagram of a peer-to-peer communication system over a USB link in accordance with yet another example of the present invention;

DETAILED DESCRIPTION OF THE INVENTION

Figure 1:
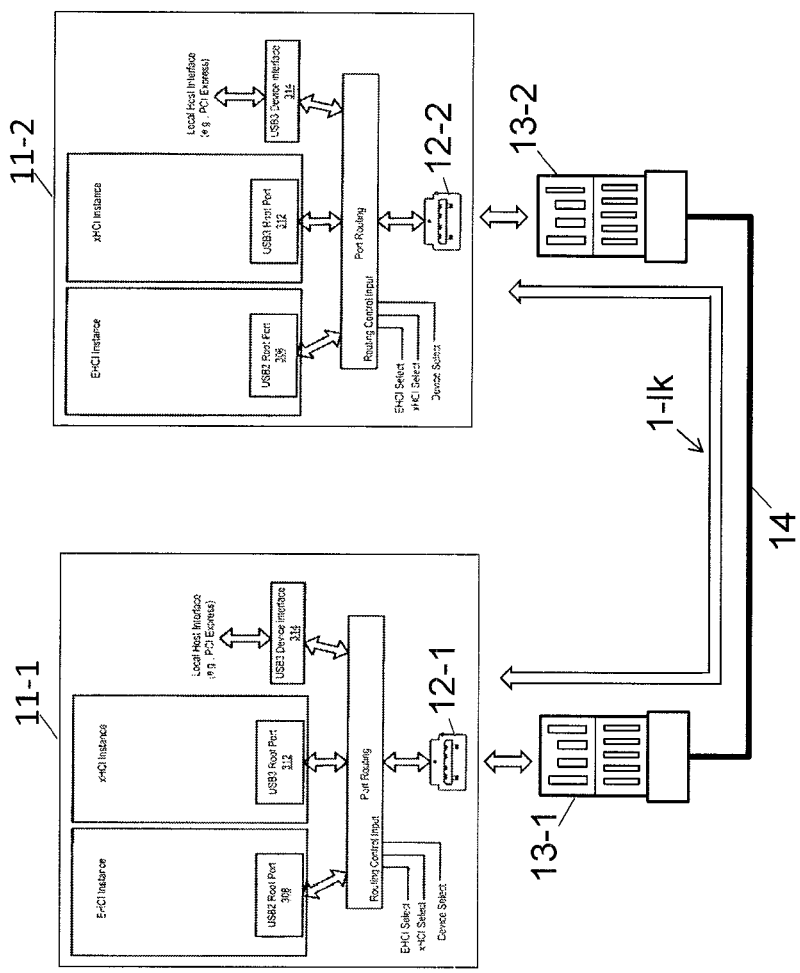
FIG. 1 is a block diagram of a peer-to-peer communication system over a Universal Serial Bus (USB) link in prior art.

Reference will now be made in detail to the present examples of the invention, examples of which are illustrated in the accompanying drawings. Wherever possible, the same reference numbers will be used throughout the drawings to refer to the same or like parts.

FIG. 2A is a block diagram of a peer-to-peer communication system 200 over a USB link 2-lk in accordance with an example of the present invention. Referring to FIG. 2A, the system 200 may include a first peer unit 21-1 having a first USB compliant receptacle 22-1, a second peer unit 21-2 having a second USB compliant receptacle 22-2, and a USB compliant cable 24. The USB compliant cable 24 may include a first USB compliant plug 23-1, a second USB compliant plug 23-2 and an apparatus 20 between the first and second USB compliant plugs 23-1 and 23-2. The first and second USB compliant plugs 23-1 and 23-2 may be coupled with the first and second USB compliant receptacles 22-1 and 22-2, respectively, so that a peer-to-peer communication between the first and second peer units 21-1 and 21-2 may be established over the USB link 2-lk through the USB compliant cable 24.

In one example, the first peer unit 21-1 may include a mass storage class (MSC) peripheral device having a USB device controller interface, such as a USB flash drive, an external magnetic hard disc drive, an external optical drive and a card reader, or include a host having a USB host controller interface (HCI) such as a personal computer, a notebook computer or a laptop. Like the first peer unit 21-1, the second peer unit 21-2 may also include an MSC peripheral device or a host. Furthermore, the first USB compliant receptacle 22-1 may include either a USB 3.0 compliant receptacle or a USB 2.0 compliant receptacle. Likewise, the second USB compliant receptacle 22-2 may also include either a USB 3.0 compliant receptacle or a USB 2.0 compliant receptacle. Moreover, the USB compliant cable 24 may include a USB 3.0 compliant cable, and thus the first and second USB compliant plugs 23-1 and 23-2 may include USB 3.0 compliant plugs.

In operation, by connecting the first and second USB compliant plugs 23-1 and 23-2 to the first and second USB compliant receptacles 22-1 and 22-2, respectively, the first and second peer units 21-1 and 21-2 may be in connection with each other through the USB link 2-lk. Specifically, the first and second peer units 21-1 and 21-2 may be in connection with each other through the USB link 2-lk via the first USB compatible receptacle 22-1, the first USB compatible plug 23-1, the apparatus 20, the second USB compatible plug 23-2 and the second USB compatible receptacle 22-2. Thereafter, peer-to-peer communication between the first and second peer units 21-1 and 21-2 over the USB link 2-lk may be available. Specifically, the apparatus 20 may perform a process to establish the peer-to-peer communication between the first and second peer units 21-1 and 21-2, which will be discussed in later paragraphs by reference to FIGS. 2B to 3G.

Figure 2B:
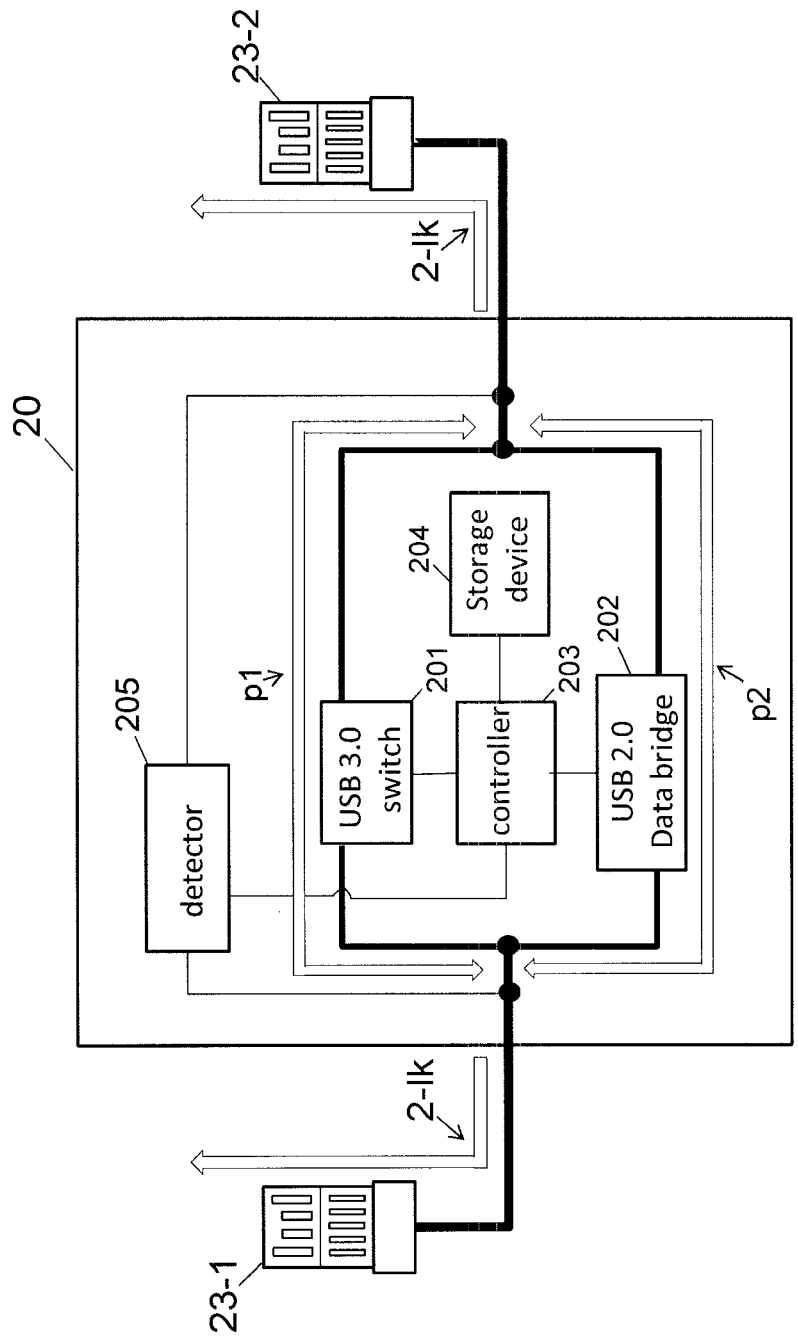
FIG. 2B is a block diagram of an apparatus of the peer-to-peer communication system illustrated in FIG. 2A over a USB link in accordance with an example of the present invention.

FIG. 2B is a block diagram of the apparatus 20 of the peer-to-peer communication system 200 illustrated in FIG. 2A. Referring to FIG. 2B, the apparatus 20 may include a USB 3.0 switch 201, a USB 2.0 data bridge 202, a controller 203, a storage device 204 and a detector 205. The USB 3.0 switch 201 may be coupled between the first and second plugs 23-1 and 23-2, forming a first path "p1". Likewise, the USB 2.0 data bridge 202 may be coupled between the first and second plugs 23-1 and 23-2, forming a second path "p2". Furthermore, the controller 203 may be coupled to the USB 3.0 switch 201, the USB 2.0 data bridge 202 and the storage device 204 in which application software (AP) and drivers for setting up the first and second peer units 21-1 and 21-2 and establishing the communication between the first and second peer units 21-1 and 21-2 are stored. The controller 203 may be configured to establish the communication between the first and second peer units 21-1 and 21-2 over the USB link 2-lk selectively via the first path p1 or the second path p2. Moreover, the detector 205, coupled between the first and second plugs 23-1 and 23-2, may detect the type of each of the first and second peer units 21-1 and 21-2. The detector 205 may be coupled to the controller 203 and inform the controller 203 of the detected types of the first and second peer units 21-1 and 21-2. Based on the types of the first and second peer units 21-1 and 21-2, the controller 203 may be configured to switch the USB link 2-lk between the first path p1 and second path p2, as will be discussed below by reference to FIGS. 3A, 3C and 3E to 3G.

Figure 3A:
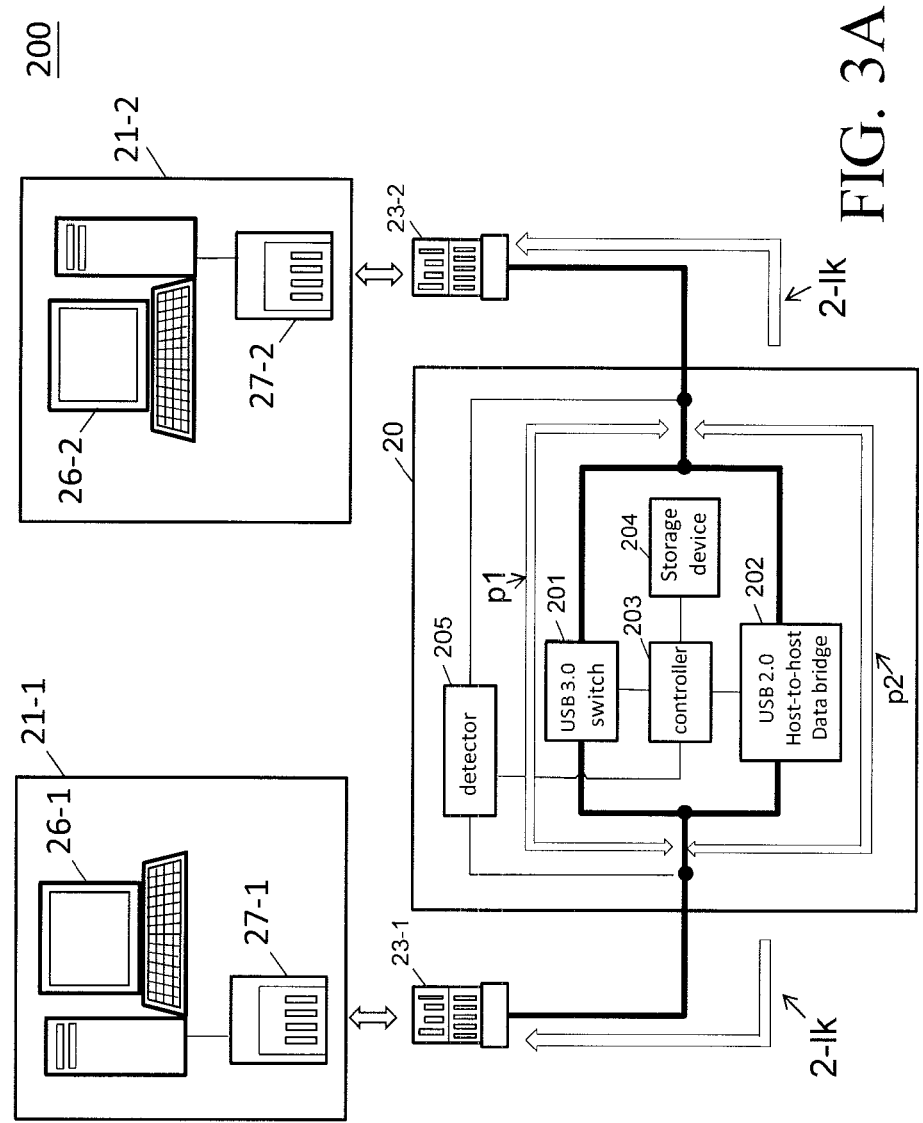
FIG. 3A is a block diagram of a peer-to-peer communication system over a USB link in accordance with another example of the present invention.

FIG. 3A is a block diagram of a peer-to-peer communication system 200 over a USB link 2-lk in accordance with another example of the present invention. Referring to FIG. 3A, in operation, first, the first and second USB 3.0 plugs 23-1 and 23-2 may be connected with the first and second USB compliant receptacles 27-1 and 27-2 of the first and second peer units 21-1 and 21-2, respectively. Then, the controller 203 may retrieve the AP and drivers from the storage device 204 and install the AP and drivers in the first and second peer units 21-1 and 21-2, where the AP and drivers may then be executed for setting up the first and second peer units 21-1 and 21-2. Once the first and second peer units 21-1 and 21-2 have been set up, the controller 203 may establish a peer-to-peer communication based on a USB 2.0 protocol between the first and second peer units 21-1 and 21-2 over the USB link 2-lk through the second path p2 via the USB 2.0 data bridge 202.

Next, the detector 205 may detect the type of each of the first and second peer units 21-1 and 21-2. In one example of the present invention, the first peer unit 21-1 may include a host such as a personal computer having a first USB compliant receptacle 27-1 of a USB 2.0 type. Moreover, the second peer unit 21-2 may also include a host 26-2 such as a personal computer having a second USB compliant receptacle 27-2 of the USB 2.0 type. The detector 205 detects the first USB compliant plug 23-1 and identifies that the first USB compliant plug 23-1 is coupled to the first USB compliant receptacle 27-1 of the USB 2.0 type, which means that the first peer unit 21-1 supports communication under the USB 2.0 protocol. Likewise, the detector 205 detects the second USB compliant plug 23-2 and identifies that the second USB compliant plug 23-2 is coupled to the second USB compliant receptacle 27-2 of the USB 2.0 type, which means that the second peer unit 21-2 supports communication under the USB 2.0 protocol. In the present example, both the first and second peer units 21-1 and 21-2 support host-to-host communication under the USB 2.0 protocol and may not support communication under a USB 3.0 protocol. Therefore, the controller 203 may disable the first path p1 by, for example, disabling the USB 3.0 switch 201 on the first path p1. The communication under the USB 2.0 protocol between the first and second peer units 21-1 and 21-2 over the USB link 2-lk via the second path p2 that is initially established by the controller 203 may be retained.

Figure 3B:
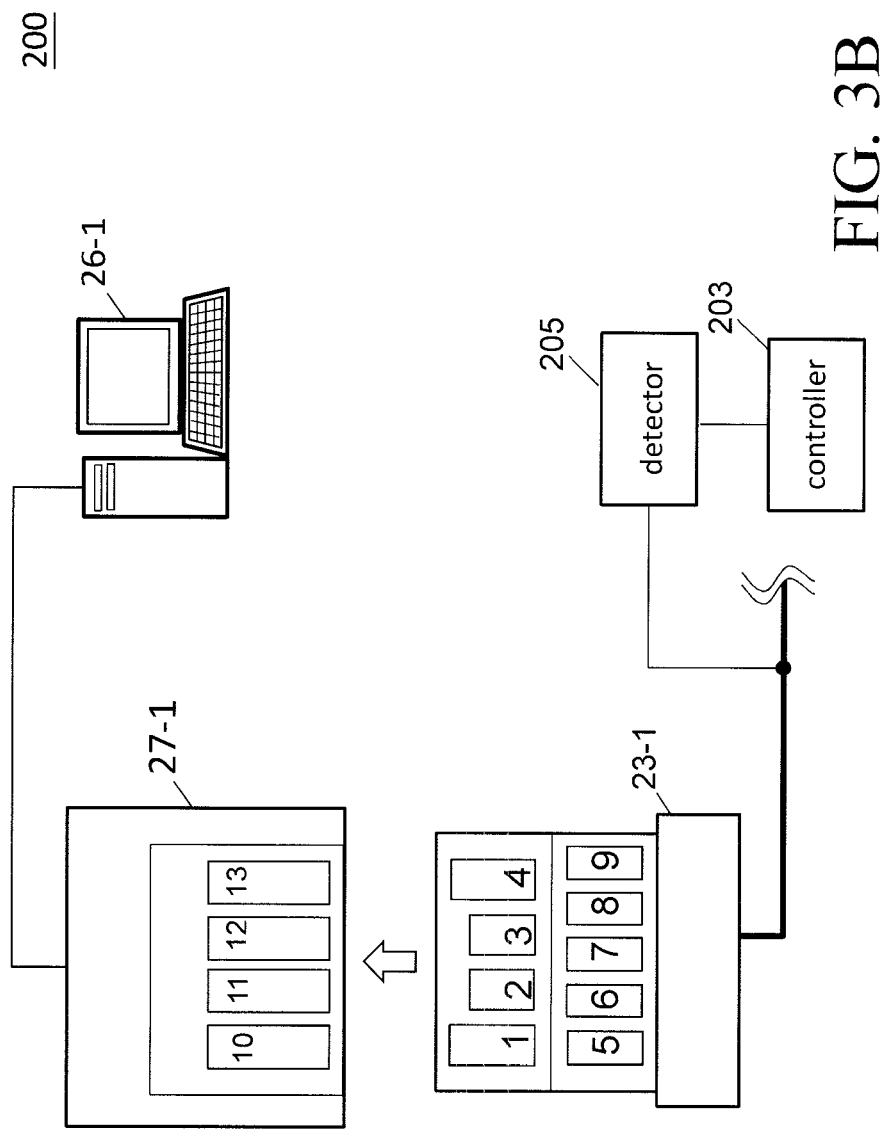
FIG. 3B is a block diagrams illustrating a detection scenario of a detector in the apparatus illustrated in FIG. 3A in accordance with an example of the present invention.

FIG. 3B is a block diagram illustrating a detection scenario of the detector 205 in the apparatus 20 illustrated in FIG. 3A in accordance with an example of the present invention. Referring to FIG. 3B, the first USB compliant receptacle 27-1 of the first host 26-1 (a personal computer in this example) is complaint with the USB 2.0 protocol, wherein contacts numbered 10, 11, 12 and 13 of the first USB compliant receptacle 27-1 are associated with the pin assignments of VDD, D$^+$, D$^-$ and GND, respectively, in accordance with the USB 2.0 protocol. When coupled with the first USB compliant receptacle 27-1, contacts numbered 1 to 4 of the first USB compliant plug 23-1, associated with the VDD, D$^+$, D$^-$ and GND pin assignments, may be coupled with the contacts 10 to 13 of the first USB compliant receptacle 27-1, respectively. Furthermore, contacts numbered 5 to 9 of the first USB compliant plug 23-1, associated with SSTX$^+$, SSTX$^-$, GND and SSRX$^+$ and SSRX$^-$ pin assignments of the USB 3.0 protocol, are not coupled to any contacts of the first USB compliant receptacle 27-1 and therefore are in a floating or high impedance status. As a result, the voltages of contacts 5 to 9 of the first USB compliant plug 23-1 may remain at their default values. In one example, the contact 7 (i.e., the GND contact) of the first USB compliant plug 23-1 may have a default voltage of logic high, for example, 3 volts (V). In such a case, the voltage of the contact 7 of the first USB compliant plug 23-1 may remain as 3V when coupled to the first USB compliant receptacle 27-1 of the first host 26-1. The default voltage of the contact 7 of the first USB compliant plug 23-1 may be detected by the detector 205 and in turn recognized by the controller 203. Subsequently, the controller 203 may identify that the first peer unit 21-1, which includes the first host 26-1 with the USB 2.0 compliant receptacle 27-1, can merely support host-to-host communication of the USB 2.0 protocol.

As to the second peer unit 21-2, similarly, the controller 203 may identify that the second peer unit 21-2, which includes the second host 26-2 with the USB 2.0 compliant receptacle 27-2, can merely support host-to-host communication of the USB 2.0 protocol. Accordingly, the host-to-host communication between the first and second peer units 21-1 and 21-2 may operate under the USB 2.0 protocol over the USB link 2-lk via the USB 2.0 data bridge 202 on the second path p2.

Figure 3C:
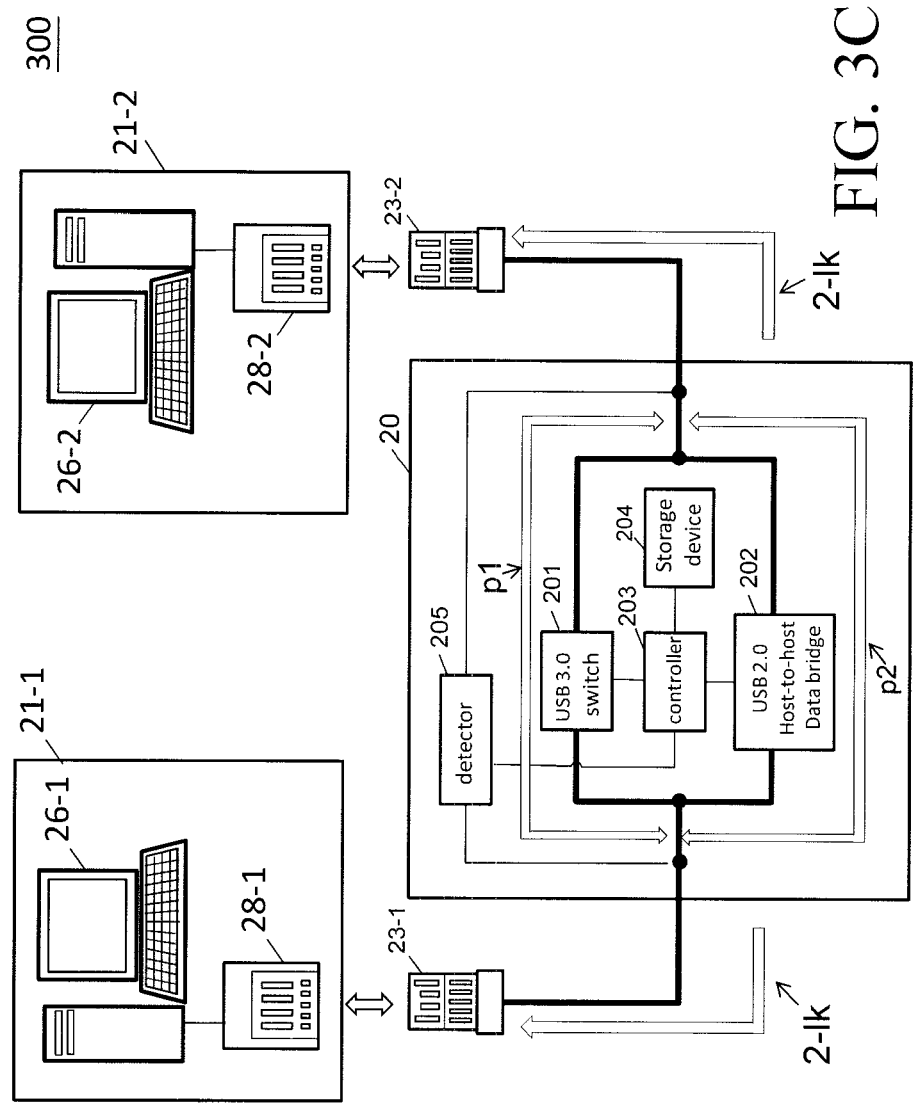
FIG. 3C is a block diagram of a peer-to-peer communication system over a USB link in accordance with still another example of the present invention.

FIG. 3C is a block diagram of a peer-to-peer communication system 300 over a USB link 2-lk in accordance with still another example of the present invention. Referring to FIG. 3C, the system 300 may be similar to the system 200 illustrated in FIG. 3A except that, each of the first and second peer units 21-1 and 21-2 may include a host having a USB 3.0 compliant receptacle. Similar to the system 200, in operation, first, the first and second USB 3.0 plugs 23-1 and 23-2 may be connected with the first and second USB 3.0 compliant receptacles 28-1 and 28-2 of the first and second peer units 21-1 and 21-2, respectively. Then, the AP and driver retrieved from the storage device 204 may be installed to and executed by the first and second peer units 21-1 and 21-2. Subsequently, the controller 203 may establish a peer-to-peer communication based on the USB 2.0 protocol between the first and second peer units 21-1 and 21-2 over the USB link 2-lk through the second path p2 via the USB 2.0 data bridge 202.

Next, the detector 205 may detect the type of each of the first and second peer units 21-1 and 21-2. Specifically, the detector 205 detects the first USB compliant plug 23-1 and identifies that the first USB compliant plug 23-1 is coupled to the USB 3.0 compliant receptacle 28-1, which means that the first peer unit 21-1 supports communication under the USB 3.0 protocol. Likewise, the detector 205 detects the second USB compliant plug 23-2 and identifies that the second USB compliant plug 23-2 is coupled to the USB 3.0 compliant receptacle 28-2, which means that the second peer unit 21-2 supports communication under the USB 3.0 protocol. Accordingly, both of the first and second peer units 21-1 and 21-2 support direct host-to-host communication under the USB 3.0 protocol. Therefore, the controller 203 may disconnect the initially established communication under the USB 2.0 protocol between the first and second peer units 21-1 and 21-2 over the USB link 2-lk via the second path p2 by, for example, disabling the USB 2.0 host-to-host data bridge 202. Then, the controller 203 may establish a new communication under the USB 3.0 protocol between the first and the second peer units 21-1 and 21-2 over the USB link 2-lk through the first path p1 via the USB 3.0 switch 201.

Figure 3D:
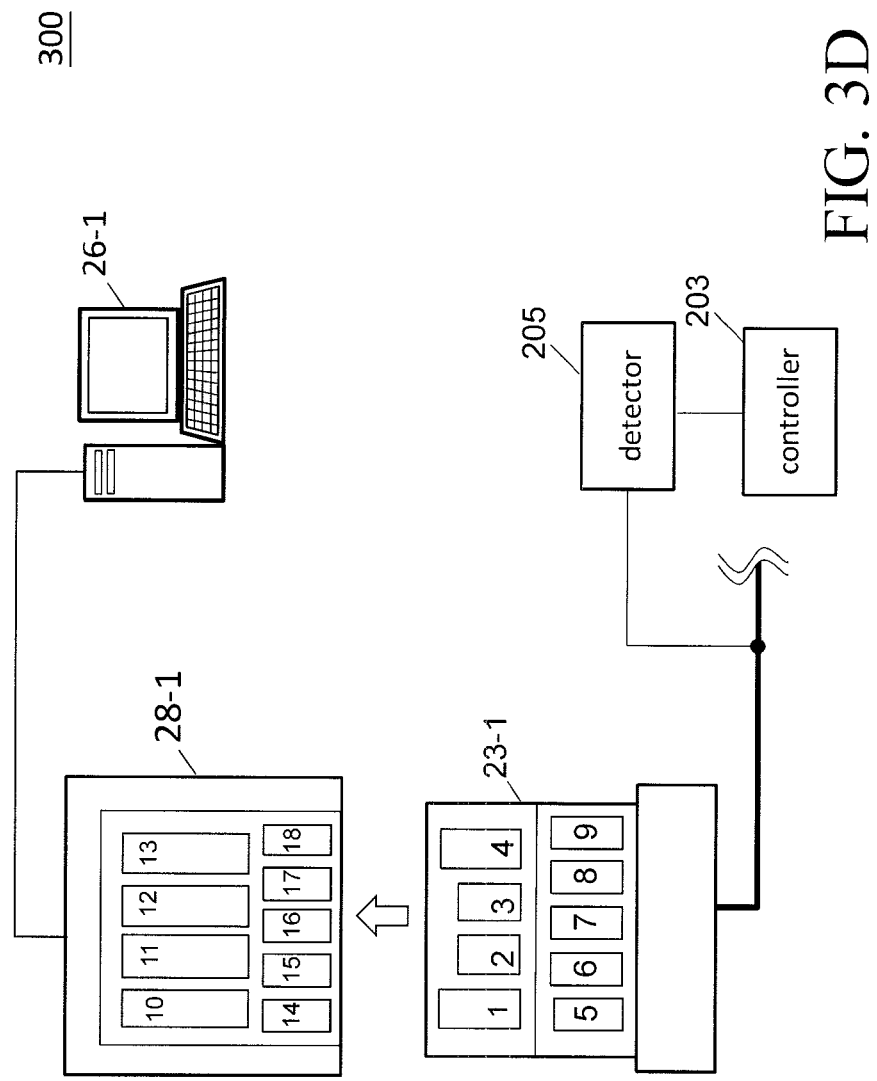
FIG. 3D is a block diagram illustrating a detection scenario of a detector in the apparatus illustrated in FIG. 3C in accordance with an example of the present invention.

FIG. 3D is a block diagram illustrating a detection scenario of the detector 205 in the apparatus 20 illustrated in FIG. 3C in accordance with an example of the present invention. Referring to FIG. 3D, the first USB compliant receptacle 28-1 of the first host 26-1 (a personal computer in this example) is complaint with the USB 3.0 standard, wherein contacts numbered 14, 15, 16, 17 and 18 of the first USB compliant receptacle 28-1 are associated with the pin assignments of SSTX$^+$, SSTX$^-$, GND, SSRX$^+$ and SSRX$^-$ in accordance with USB 3.0 protocol, respectively. When coupled with the first USB compliant receptacle 28-1, contacts numbered 1 to 4 of the first USB compliant plug 23-1, associated with the VDD, D$^+$, if and GND pin assignments of the USB 2.0 protocol, may be coupled with the contacts 10 to 13 of the first USB compliant receptacle 28-1, respectively. Furthermore, the contacts 5 to 9 of the first USB compliant plug 23-1, associated with the SSTX$^+$, SSTX$^-$, GND, SSRX$^+$ and SSRX$^-$ pin assignments of the USB 3.0 protocol, may be coupled with the contacts 14 to 18 of the first USB compliant receptacle 28-1. Accordingly, unlike the contacts 5 to 9 illustrated in FIG. 3B, the voltage values of contacts 5 to 9 of the first USB compliant plug 23-1 may be equivalent to those of contacts 14 to 18 of the first USB compliant receptacle 28-1, respectively. Since the contact 16 (i.e., the GND contact) of the USB 3.0 compliant receptacle 28-1 may have a voltage value of logic low or a reference voltage (for example, zero volt), the voltage value of the contact 7 (i.e., the GND contact) of the first USB compliant plug 23-1 may change from its default value (for example, 3V) to 0V when the first USB compliant plug 23-1 is coupled to the USB 3.0 compliant receptacle 28-1. Such a change in the voltage value of the contact 7 of the first USB compliant plug 23-1 may be detected by the detector 205 and then recognized by the controller 203. Thereby, the controller 203 may identify that the first peer unit 21-1, which includes the first host 26-1 with the USB 3.0 compliant receptacle 28-1, is able to support host-to-host communication under the USB 3.0 protocol.

As to the second peer unit 21-2, similarly, the controller 203 may identify that the second peer unit 21-2, which includes the second host 26-2 with the USB 3.0 compliant receptacle 28-2, is also able to support host-to-host communication under the USB 3.0 protocol. Accordingly, the initially established communication under the USB 2.0 protocol between the first and second peer units 21-1 and 21-2 over the USB link 2-lk via the second path p2 may be disconnected, and new communication under the USB 3.0 protocol between the first and the second peer units 21-1 and 21-2 over the USB link 2-lk via the USB 3.0 switch 201 on the first path p1 may then be established by the controller 203.

Figure 3E:
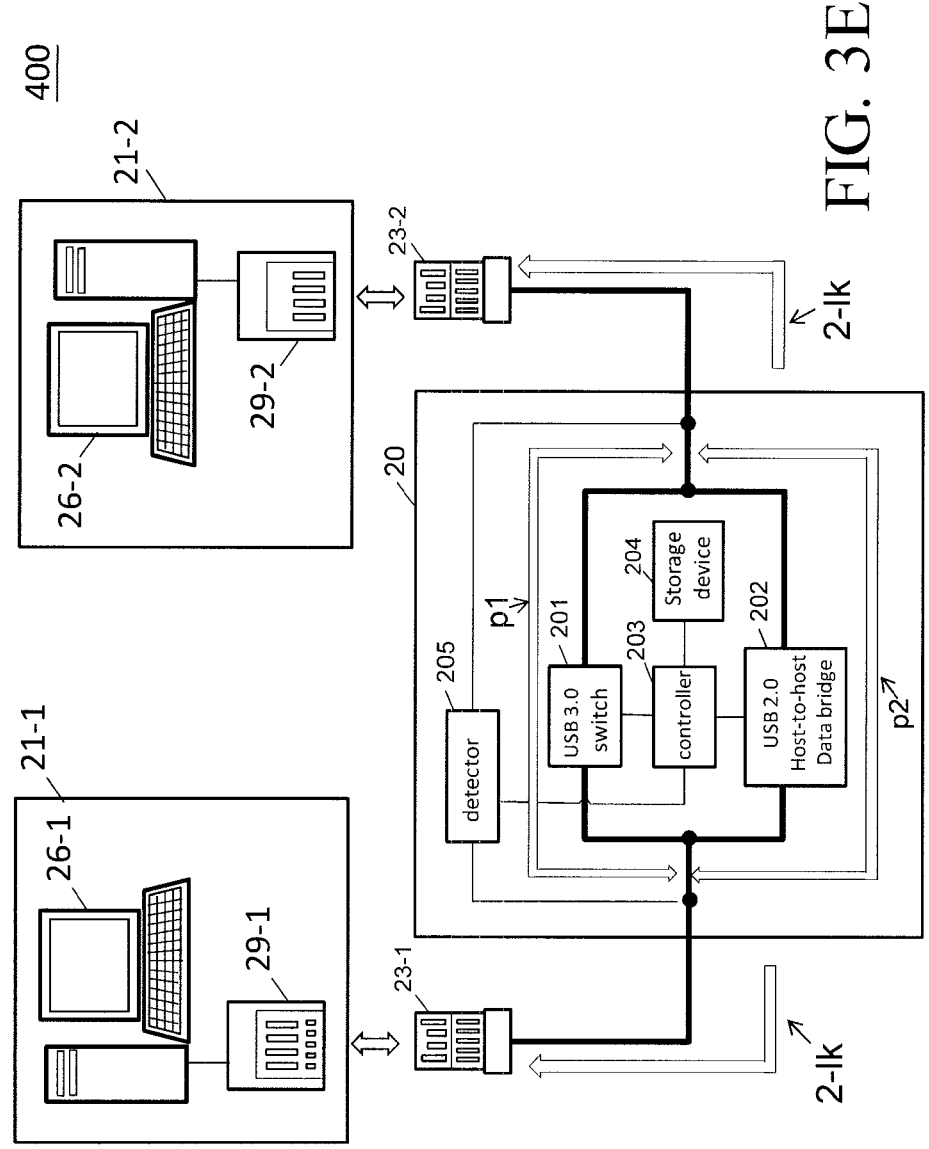
FIG. 3E is a block diagram of a peer-to-peer communication system over a USB link in accordance with yet another example of the present invention.

FIG. 3E is a block diagram of a peer-to-peer communication system 400 over a USB link 2-lk in accordance with yet another example of the present invention. Referring to FIG. 3E, the system 400 may be similar to the system 200 illustrated in FIG. 3A except that, the first peer unit 21-1 may include a host 26-1 having a USB 3.0 compliant receptacle 29-1. Similar to the system 200, in operation, first, the first and second USB 3.0 plugs 23-1 and 23-2 may be connected with the first compliant receptacle 29-1 of the USB 3.0 type and the second compliant receptacle 29-2 of USB 2.0 type, respectively. Then, the AP and driver loaded from the storage device 204 may be installed to and executed by the first and second peer units 21-1 and 21-2. Subsequently, the controller 203 may establish a peer-to-peer communication under the USB 2.0 protocol between the first and second peer units 21-1 and 21-2 over the USB link 2-lk through the second path p2 via the USB 2.0 data bridge 202. Next, the detector 205 may detect the type of each of the first and second peer units 21-1 and 21-2. As previously discussed in the former paragraphs by reference to FIGS. 3B and 3D, the detector 205 identifies that the first USB compliant plug 23-1 is coupled to the USB 3.0 compliant receptacle 29-1 and the second USB compliant plug 23-2 is coupled to the USB 2.0 compliant receptacle 29-2, which means that the first peer unit 21-1 is able to support communication under the USB 3.0 protocol while the second peer unit 21-2 can merely support host-to-host communication under the USB 2.0 protocol. Therefore, the initially established communication under the USB 2.0 protocol between the first and second peer units 21-1 and 21-2 over the USB link 2-lk via the second path p2 may be retained. Furthermore, the controller 203 may disable the USB 3.0 switch 201 and in turn disconnect the first path p1.

Figure 3F:
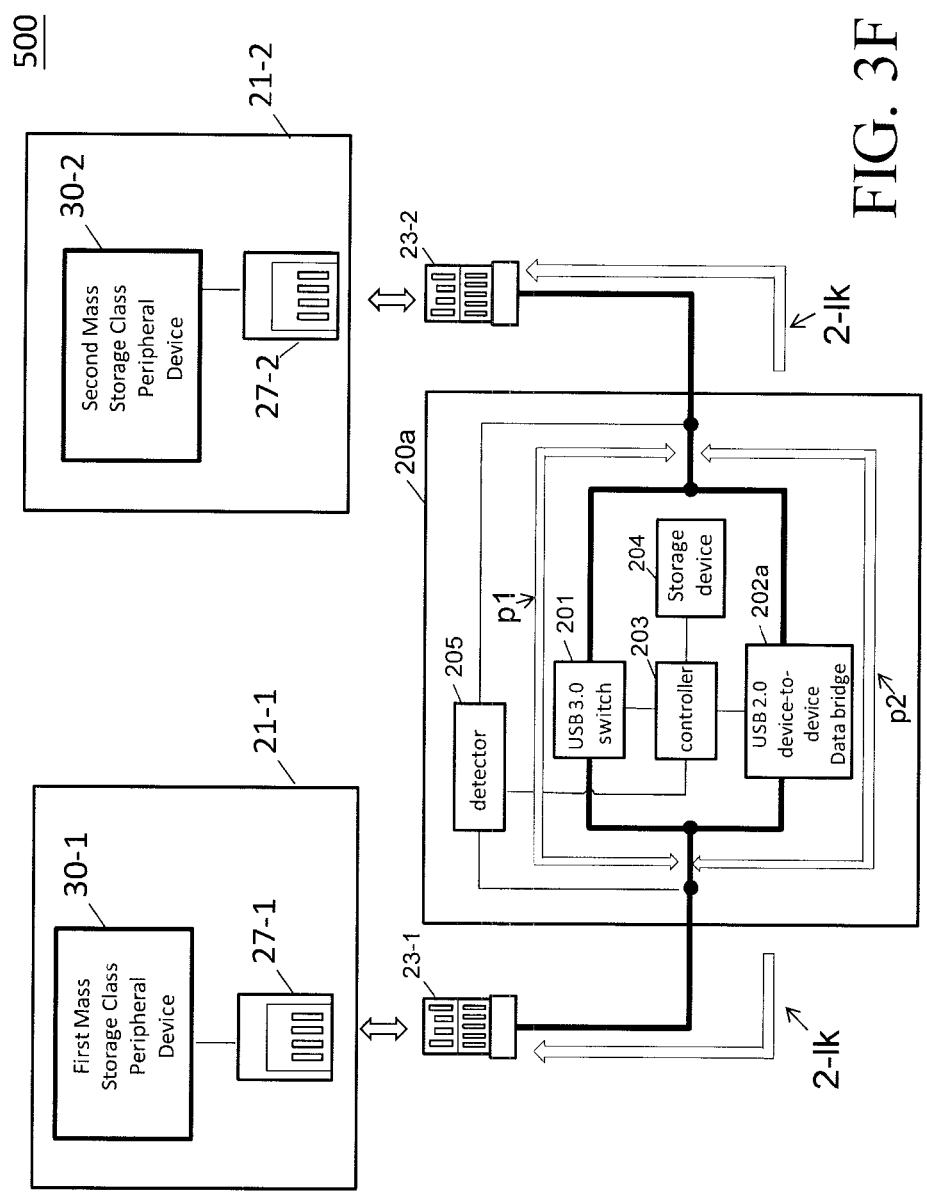
FIG. 3F is a block diagram of a peer-to-peer communication system over a USB link in accordance with a further example of the present invention.

FIG. 3F is a block diagram of a peer-to-peer communication system 500 over a USB link 2-lk in accordance with a further example of the present invention. Referring to FIG. 3F, the system 500 may be similar to the system 200 illustrated in FIG. 3A except that, the first peer unit 21-1 may include a first MSC peripheral device 30-1 having a first USB compliant receptacle 27-1 of the USB 2.0 type and the second peer unit 21-2 may include a second MSC peripheral device 30-2 having a second USB compliant receptacle 27-2 of the USB 2.0 type. The first and second MSC peripheral devices 30-1 and 30-2 may include, for example, USB flash drives, external magnetic hard disc drives, external optical drives and card readers. Furthermore, the apparatus 20a may include a USB 2.0 device-to-device data bridge 202a instead of the USB 2.0 host-to-host data bridge 202 illustrated in FIG. 3A.

Similar to the system 200, in operation, first, the first and second USB 3.0 plugs 23-1 and 23-2 may be connected with the first compliant receptacle 27-1 of the USB 2.0 type and the second USB compliant receptacle 27-2 of the USB 2.0 type, respectively. Then, the AP and driver loaded from the storage device 204 may be installed to and executed by the first and second peer units 21-1 and 21-2. Subsequently, the controller 203 may establish a peer-to-peer communication under the USB 2.0 protocol between the first and second peer units 21-1 and 21-2 over the USB link 2-lk via the second path p2 through the USB 2.0 device-to-device data bridge 202a. Next, the detector 205 may detect the type of each of the first and second peer units 21-1 and 21-2. As previously discussed in the former paragraphs by reference to FIG. 3B, the detector 205 identifies that the first and second USB compliant plugs 23-1 and 23-2 are coupled to the first and second USB 2.0 compliant receptacles 27-1 and 27-2, respectively, which means the first and second peer units 21-1 and 21-2 can merely support device-to-device communication under the USB 2.0 protocol. Therefore, the initially established communication of the USB 2.0 protocol between the first and second peer units 21-1 and 21-2 over the USB link 2-lk via the second path p2 may be retained. Furthermore, the controller 203 may disable the USB 3.0 switch 201 and in turn disconnect the first path p1.

FIG. 3G is a block diagram of a peer-to-peer communication system 600 over a USB link 2-lk in accordance with yet another example of the present invention. Referring to FIG. 3G, the system 600 may be similar to the system 200 illustrated in FIG. 3A except that, each of the first and second peer units 21-1 and 21-2 may include a USB On-The-Go (OTG) compliant device having a USB 2.0 compliant receptacle. The first and second USB OTG compliant devices 31-1 and 31-2 may include, for example, mobile phones, media players and optical media recorders. Furthermore, the apparatus 20b may include a USB OTG adaptor 202b instead of the USB 2.0 host-to-host data bridge 202 illustrated in FIG. 3A.

Similar to the system 200, in operation, first, the first and second USB 3.0 plugs 23-1 and 23-2 may be connected with the first and second USB 2.0 receptacles 27-1 and 27-2, respectively. Then, the AP and driver loaded from the storage device 204 may be installed to and executed by the first and second peer units 21-1 and 21-2. Subsequently, a direct device-to-device communication under the USB 2.0 protocol between the first and second USB OTG devices 31-1 and 31-2 over the USB link 2-lk via the second path p2 through the USB OTG adaptor 202b may be established. Next, the detector 205 may detect the type of each of the first and second peer units 21-1 and 21-2. As previously discussed in the former paragraphs by reference to FIG. 3B, the detector 205 identifies that the first and second USB compliant plugs 23-1 and 23-2 are coupled to the first and second USB 2.0 compliant receptacles 27-1 and 27-2, respectively, which means that the first and second peer units 21-1 and 21-2 can merely support device-to-device communication under the USB 2.0 protocol. Therefore, the initially established communication of the USB 2.0 protocol between the first and second peer units 21-1 and 21-2 over the USB link 2-lk via the second path p2 may be retained. Furthermore, the controller 203 may disable the USB 3.0 switch 201 and in turn disconnect the first path p1.

Figure 4:
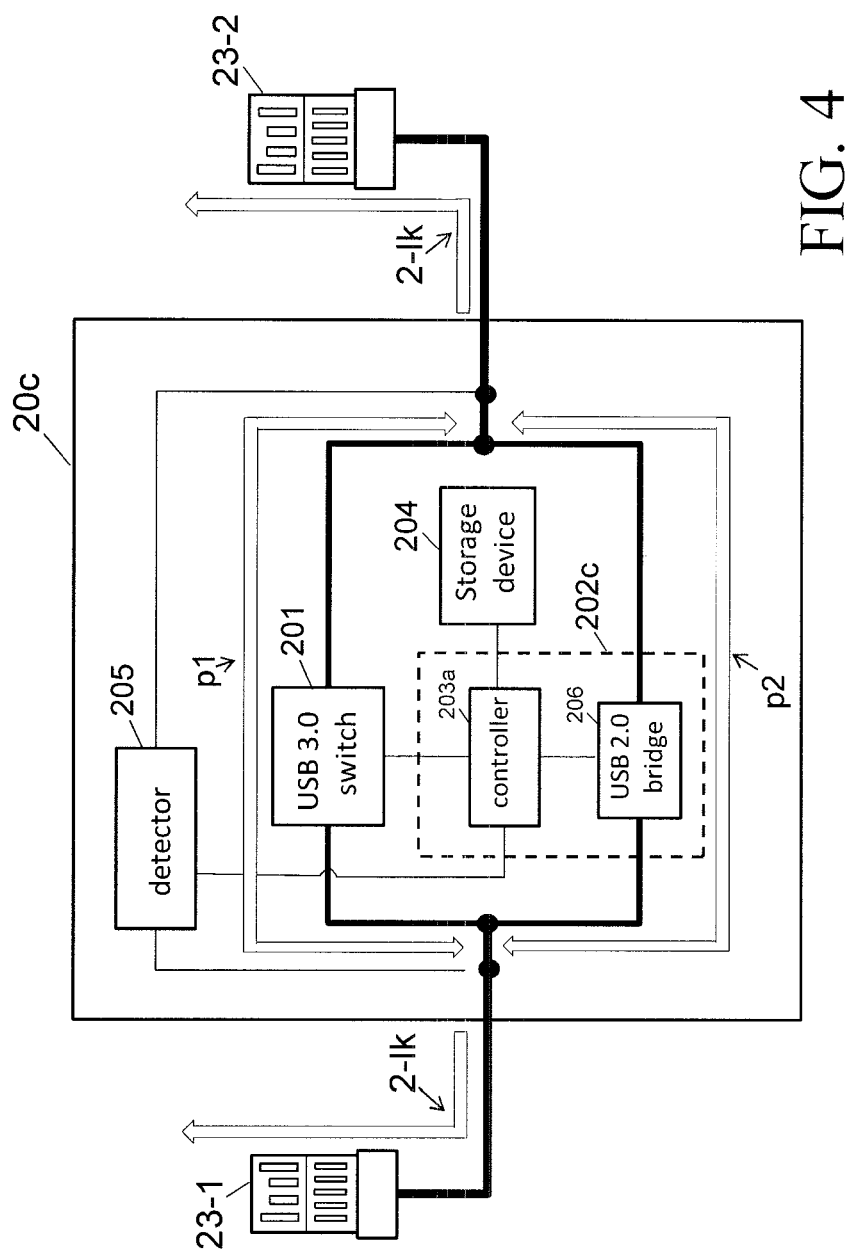
FIG. 4 is a block diagram of an apparatus of the peer-to-peer communication system illustrated in FIG. 2A over a USB link in accordance with another example of the present invention.

FIG. 4 is a block diagram of an apparatus 20c of the peer-to-peer communication system 200 illustrated in FIG. 2A over a USB link 2-lk in accordance with another example of the present invention. Referring to FIG. 4, the apparatus 20c may be similar to the apparatus 20 illustrated in FIG. 2B except that, the controller 203a of the apparatus 20c may be embedded in the USB 2.0 data bridge 202c. That is, the USB 2.0 data bridge 202c of the apparatus 20c may include a controller 203a and a USB 2.0 bridge 206. The USB 2.0 bridge 206 may be coupled to the first and second sections 24-1 and 24-2 of the USB cable 24 on the second path p2. Furthermore, the controller 203a may be configured to establish the peer-to-peer communication over the USB link 2-lk via one of the first path p1 and the second path p2.

Figure 5:
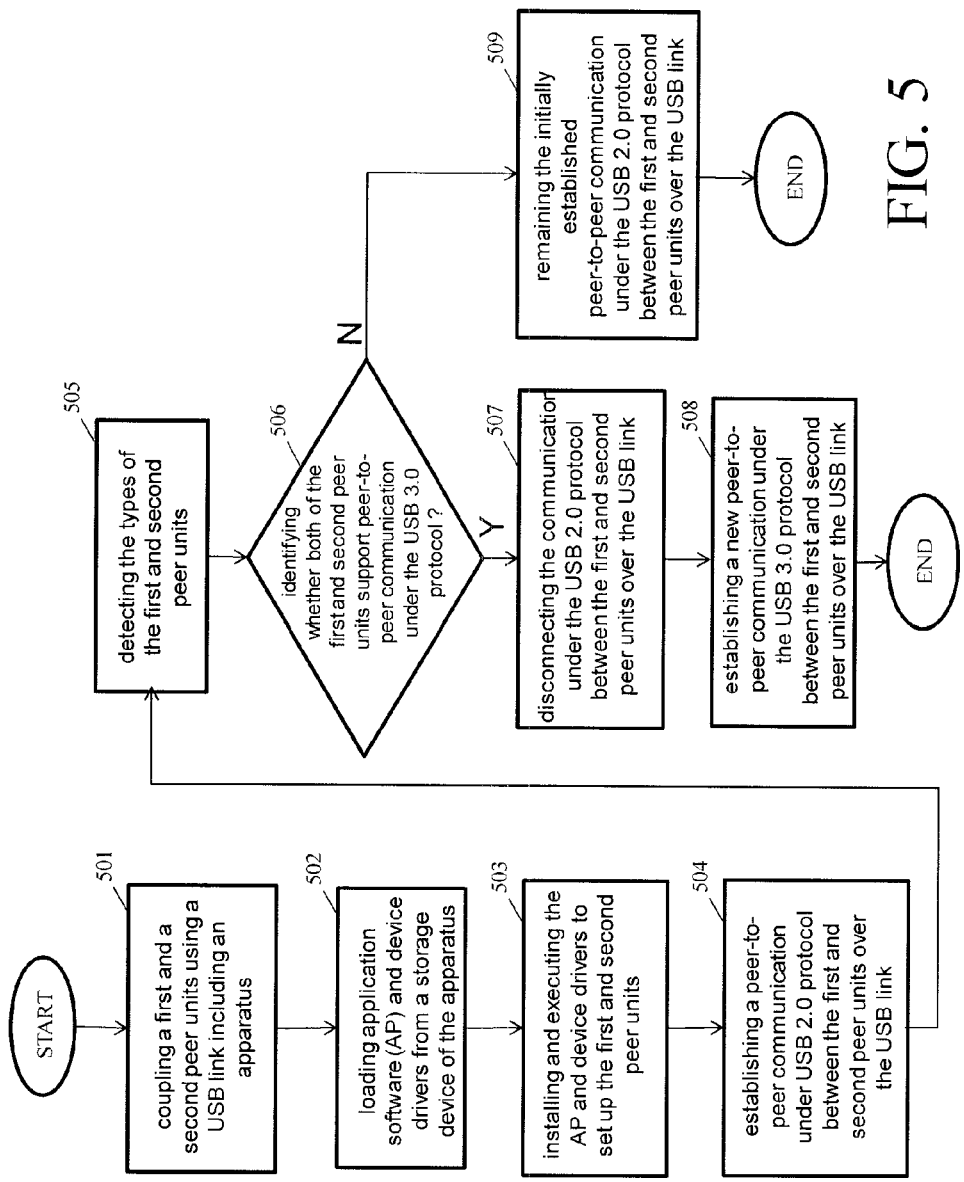
FIG. 5 is flow diagram illustrating a method of establishing peer to peer communication over a Universal Serial Bus (USB) link in accordance with an example of the present invention.

FIG. 5 is flow diagram illustrating a method of establishing peer-to-peer communication over a Universal Serial Bus (USB) link in accordance with an example of the present invention. Referring to FIG. 5, at step 501, the first and second peer units 21-1 and 21-2 of, for example, the system 200 illustrated in 3A are coupled with each other over the USB link 2-lk through a USB-compliant cable 24 that includes an apparatus 20.

Next, at step 502, AP and device drivers required to set up the peer-to-peer communication may be retrieved from the storage device 204 of the apparatus 20.

Next, at step 503, the AP and device drivers may be installed to and executed by the first and second peer units 21-1 and 21-2. Thereby, the first and second peer units 21-1 and 21-2 may be set up for performing USB type peer-to-peer communication.

Next, at step 504, a USB 2.0 type peer-to-peer communication between the first and second peer units 21-1 and 21-2 over the USB link 2-lk may be established by the controller 203 of the apparatus 20 via the second path p2 through the USB 2.0 data bridge 202.

Next, at step 505, the types of the first and second peer units 21-1 and 21-2 may be identified. Specifically, the latest USB versions or types that the first and second peer units 21-1 and 21-2 can support may be detected by the detector 203 of the apparatus 20, as previously discussed in the former paragraphs by reference to FIGS. 3B and 3D. More particularly, at step 506, the first and second USB plugs 23-1 and 23-2 may be detected so as to identify which USB types of receptacles they are coupled. If both of the first and second USB plugs 23-1 and 23-2 are coupled with the first and second receptacles 27-1 and 27-2 both of the USB 3.0 type, then both of the first and second peer units 21-1 and 21-2 are able to support USB 3.0 type communication.

At step 507, subsequent to step 506, the initially-established USB 2.0 type of peer-to-peer communication between the first and second peer units 21-1 and 21-2 may be disconnected by the controller 203 by, for example, disabling the USB 2.0 data bridge 202 and in turn disconnecting the second path p2.

Next, at step 508, the USB link 2-lk may be switched to the first path p1 passing through the USB 3.0 switch 201. Furthermore, new peer-to-peer communication under the USB 3.0 protocol between the first and second peer units 21-1 and 21-2 may be established over the USB link 2-lk via the first path p1.

Alternatively, referring back to step 506, if at least one of the first and second USB plugs 23-1 and 23-2 are coupled with the USB 2.0 receptacle(s), then at least one of the first and second peer units 21-1 and 21-2 can merely support the USB 2.0 type communication. Accordingly, at step 509, the initially-established USB 2.0 type communication between the first and second peer units 21-1 and 21-2 may be retained.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

Further, in describing representative examples of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

I claim:

1. An apparatus for peer-to-peer communication over a Universal Serial Bus (USB) link, the apparatus comprising:
   a USB 3.0 compliant switch between a first peer unit and a second peer unit, wherein each of the first peer unit and the second peer unit supports a USB type of communication;
   a USB 2.0 compliant bridge between the first peer unit and the second peer unit;
   a detector to detect the USB type of each of the first peer unit and the second peer unit; and
   a controller to selectively switch the USB link between a first path through the USB 3.0 compliant switch and a second path through the USB 2.0 compliant bridge based on the USB types of the first peer unit and the second peer unit.

2. The apparatus of claim 1 further comprising a storage device to store application software (AP) and drivers, wherein the controller is configured to retrieve the AP and drivers from the storage device and install the AP and drivers for setting up the first and second peer units.

3. The apparatus of claim 1 further comprising a first USB 3.0 compliant plug and a second USB 3.0 compliant plug coupled with the USB 2.0 compliant bridge and the USB 3.0 compliant switch.

4. The apparatus of claim 3, wherein the first USB 3.0 compliant plug is to be coupled with the first peer unit via a first USB compliant receptacle, and the second USB 3.0 compliant plug is to be coupled with the second peer unit via a second USB compliant receptacle.

5. The apparatus of claim 4, wherein each of the first and second USB compliant receptacles includes one of a USB 3.0 compliant receptacle and a USB 2.0 compliant receptacle.

6. The apparatus of claim 1, wherein the first and second peer units are a pair of USB hosts both of which support USB 3.0 type of communication, and the controller is configured to switch the USB link to the first path in response to the USB types of the first and second peer units.

7. The apparatus of claim 1, wherein the first and second peer units are a pair of USB hosts both of which only support USB 2.0 type of communication, and the controller is configured to switch the USB link to the second path in response to the USB types of the first and second peer units.

8. The apparatus of claim 1, wherein the first and second peer units are a pair of USB hosts and only one of which supports USB 3.0 type of communication, and the controller is configured to switch the USB link to the second path in response to the USB types of the first and second peer units.

9. The apparatus of claim 1, wherein the first and second peer units are a pair of USB devices both of which only support USB 2.0 type of communication, and the controller is configured to switch the USB link to the second path in response to the USB types of the first and second peer units.

10. The apparatus of claim 1, wherein the USB 2.0 compliant bridge includes at least one of a USB 2.0 compliant host-to-host data bridge, a USB 2.0 compliant device-to-device data bridge or a USB "on-the-go" (OTG) adaptor.

11. The apparatus of claim 10, wherein the first and second peer units are a pair of USB devices both of which only support USB 2.0 type of communication, and the USB 2.0 compliant bridge includes a USB 2.0 compliant device-to-device bridge.

12. The apparatus of claim 10, wherein the first and second peer units are a pair of USB devices both of which support USB OTG type of communication, and the USB 2.0 compliant bridge includes a USB OTG adaptor.

13. A method of establishing peer-to-peer communication over a Universal Serial Bus (USB) link, the method comprising:
   providing a first peer unit and a second peer unit, wherein each of the first peer unit and the second peer unit supports a USB type of communication;
   providing a USB 3.0 compliant switch to be coupled between the first peer unit and the second peer unit;
   providing a USB 2.0 compliant bridge to be coupled between the first peer unit and the second peer unit;
   establishing a USB type of communication between the first peer unit and the second peer unit over the USB link via one of a first path through the USB 3.0 compliant switch and a second path through the USB 2.0 compliant bridge;
   detecting the USB type of each of the first peer unit and the second peer unit; and
   selectively switching the USB link between the first path and the second path based on the USB types of the first peer unit and the second peer unit.

14. The method of claim 13 further comprising providing and executing application software (AP) and drivers to set up the first and second peer units so as to establish the USB type of communication between the first and second peer units.

15. The method of claim 13, wherein establishing the USB type of communication between the first peer unit and the second peer unit comprises establishing a USB 2.0 type of communication.

16. The method of claim 15 further comprising identifying that both of the first and second peer units support USB 3.0 type of communication, and switching the USB link to the first path.

17. The method of claim 16 further comprising disconnecting the USB 2.0 type communication between the first and second peer units over the USB link via the second path.

18. The method of claim 15 further comprising identifying that one of the first and second peer units only supports USB 2.0 type of communication, and remaining the USB link via the second path.

* * * * *